(12) United States Patent
Kläbe et al.

(10) Patent No.: US 11,907,223 B2
(45) Date of Patent: Feb. 20, 2024

(54) SYSTEM AND METHOD FOR EXECUTING COMPILED USER DEFINED FUNCTIONS IN VECTORIZED DATABASES

(71) Applicant: ACTIAN CORPORATION, Round Rock, TX (US)

(72) Inventors: Steffen Kläbe, Ilmenau (DE); Robert P. Desantis, San Jose, CA (US)

(73) Assignee: ACTIAN CORPORATION, Round Rock, TX (US)

( * ) Notice: Subject to any disclaimer, the term of this patent is extended or adjusted under 35 U.S.C. 154(b) by 0 days.

(21) Appl. No.: 17/873,906

(22) Filed: Jul. 26, 2022

(65) Prior Publication Data

US 2023/0080220 A1    Mar. 16, 2023

Related U.S. Application Data

(60) Provisional application No. 63/237,429, filed on Aug. 26, 2021.

(51) Int. Cl.
*G06F 16/2453* (2019.01)
(52) U.S. Cl.
CPC .............................. *G06F 16/24549* (2019.01)
(58) Field of Classification Search
CPC .................................................. G06F 16/24549
See application file for complete search history.

(56) References Cited

U.S. PATENT DOCUMENTS

| | | | |
|---|---|---|---|
| 9,355,145 B2 | 5/2016 | George | |
| 10,613,855 B2 | 4/2020 | Moustafa et al. | |
| 11,023,460 B2 | 6/2021 | Yuan et al. | |
| 2002/0198891 A1* | 12/2002 | Li | G06F 16/289 707/999.102 |
| 2012/0191732 A1* | 7/2012 | George | G06F 16/283 707/E17.014 |
| 2021/0406311 A1* | 12/2021 | Brossard | G06F 16/2282 |

OTHER PUBLICATIONS

Behnel, S., et al., "Cython: The Best of Both Worlds", Computing in Science & Engineering, pp. 31-39, Mar./Apr. 2011.
Boncz, Peter, et al., "TPC-H Analyzed: Hidden Messages and Lessons Learned from an Influential Benchmark", TPCTC, vol. 8391, pp. 61-76, 2014.
Duta, C., et al., "Compiling PL/SQL Away", Conference on Innovative Data Systems Research (CIDR), Jan. 2020.
Graefe, Goetz, "Volcano—An Extensible and Parallel Query Evaluation System", IEEE Transactions on Knowledge and Data Engineering, vol. 6, No. 1, pp. 120-135, Feb. 1994.

(Continued)

*Primary Examiner* — William Spieler
(74) *Attorney, Agent, or Firm* — ArentFox Schiff LLP

(57) ABSTRACT

Aspects described herein relate to executing a compiled user defined function (UDF) in an interpreted database query engine. A database query that invokes a UDF defined in an interpreted programming language can be received, and a shared library produced by compiling the UDF can be loaded during database runtime. The UDF can be executed via the shared library during the invocation of the database query, or another database query, in the interpreted database query engine.

20 Claims, 6 Drawing Sheets

(56) References Cited

OTHER PUBLICATIONS

Gupta, Surabhi, "Procedural Extensions of SQL: Understanding their usage in the wild", PVLDB Endowment, vol. 14, No. 8, pp. 1378-1391, May 2021.
Kläbe, Steffen, et al., "When Bears get Machine Support: Applying Machine Learning Models to Scalable Data Frames with Grizzly", BTW, pp. 195-214, 2021.
Lam, Siu Kwan, et al., "Numba: A LLVM-based Python JIT Compiler", LLVM-HPC2015, 2015.
Liu, Yinhan, "RoBERTa: A Robustly Optimized BERT Pretraining Approach", eprint: 1907.11692.
Maas, Andrew L., et al., "Learning Word Vectors for Sentiment Analysis", Proceedings of the 49th Annual Meeting of the Association for Computational Linguistics, pp. 142-150, 2011.
Meier, Remigius, et al., "A Way Forward in Parallelising Dynamic Languages", ICOOOLPS, pp. 1-4, Jul. 28, 2014.
Meier, Remigius, et al., "Virtual Machine Design for Parallel Dynamic Programming Languages", Proc. ACM Program Lang., vol. 2, Article 109, pp. 1-24, Nov. 2018.
Odaira, Rei, et al., "Eliminating Global Interpreter Locks in Ruby through Hardware Transactional Memory", PPoPP'14, pp. 131-142, Orlando, Florida, 2014.
Raasveldt, Mark, et al., "Vectorized UDFs in Column-Stores", SSDBM '16, pp. 1-12, Budapest, Hungary, 2016.
Schule, Maximilian E., et al., "Freedom for the SQL-Lambda: Just-in-Time-Compiling User-Injected Functions in PostageSQQL", SSDBM 2020, pp. 1-12, Vienna, Austria, Jul. 2020.
Spiegelberg, Leonhard, et al., "Tuplex: Data Science in Python at Native Code Speed", SIGMOD '21, pp. 1718-1731, 2021.
International Search Report and Written Opinion dated Dec. 16, 2022, issued by the International Searching Authority in International Patent Application No. PCT/US2022/38688.

* cited by examiner

SYSTEM AND METHOD FOR EXECUTING COMPILED USER DEFINED FUNCTIONS IN VECTORIZED DATABASES

CLAIM OF PRIORITY UNDER 35 U.S.C. § 119

The present Application for Patent claims priority to Provisional Patent Application No. 63/237,429, entitled "SYSTEM AND METHOD FOR EXECUTING COMPILED USER DEFINED FUNCTIONS IN VECTORIZED DATABASES" filed Aug. 26, 2021, which is assigned to the assignee hereof and hereby expressly incorporated by reference herein for all purposes.

FIELD

The disclosures relates to database systems, and more particularly to executing user defined function (UDFs) in database systems.

BACKGROUND

User-defined functions (UDFs) play an important role in modern data analytics, as they offer a flexible, modular and reusable way to get business insights tailored for the user's needs. Many popular data warehouse systems integrate UDFs in different flavors to extend the functionality of the structured query language (SQL) frontend. Depending on the actual system, users can define UDFs using programming languages, such as C/C++, Java, Python, Scala or Javascript code, etc., and use them in SQL queries. Additionally, UDFs can be classified into at least two types, including scalar UDFs, that produce a single result per input tuple, and table UDFs, that produce a new (potentially empty) table with an arbitrary number of results for a given input table.

Python evolved to one of the most popular languages for data analytics over the recent years, which has several reasons. First, Python is considered easy to write and enables rapid prototyping, as a lot of challenges like typing are solved by the interpreter and are not a user's responsibility. Second, a large amount of frameworks were developed for data intensive tasks like data cleaning, data analytics and especially machine learning. This way, setting up and maintaining a database system, creating tables and loading data is not necessary to get fast insights in small datasets. Consequently, Python has a wide range of users and may make it obsolete to be a SQL expert to analyze data.

As a result, offering Python UDFs increases a database system's usability for a wide range of users. However, the major bottleneck of UDFs is scalability, as UDFs can consume the major part of the query runtime. This especially holds for Python UDFs due to several reasons. First, data needs to be converted from the internal database representation to a Python format and vice versa for the UDF results. Second, data needs to be transferred to the Python interpreter outside the database engine and results back to the engine. Third, the interpreted code execution in the Python interpreter is typically slower than the execution of compiled and optimized code in the database engine.

There are several frameworks that target at increasing Python code performance by compiling Python code just-in-time (JIT) or ahead-of-time (AOT). Similar to this approach of interpreted versus compiled Python code, the dominant database design approaches of the last decades are also interpreted (or vectorized) query engines versus compiled query engines. While interpreted query engines build a query execution plan from a set of pre-defined operators and follow an iterator model, compiled query engines produce code for each specific query and compile it to an executable, which is run to produce the query result. In comparison to interpreted engines, there is a tradeoff between the additional effort to produce and compile code for each query and the faster execution of optimized and compiled code.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an aspect, the disclosure provides a computer-implemented method for executing a compiled user defined function (UDF) in an interpreted database query engine. The method includes receiving, from an interface, a database query that invokes a UDF defined in an interpreted programming language, loading, during database runtime, in a memory, and based on detecting the UDF in the database query, a shared library produced by compiling the UDF, and executing the UDF via the shared library during the invocation of the database query, or another database query, in the interpreted database query engine.

In another aspect, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

Figure 1:
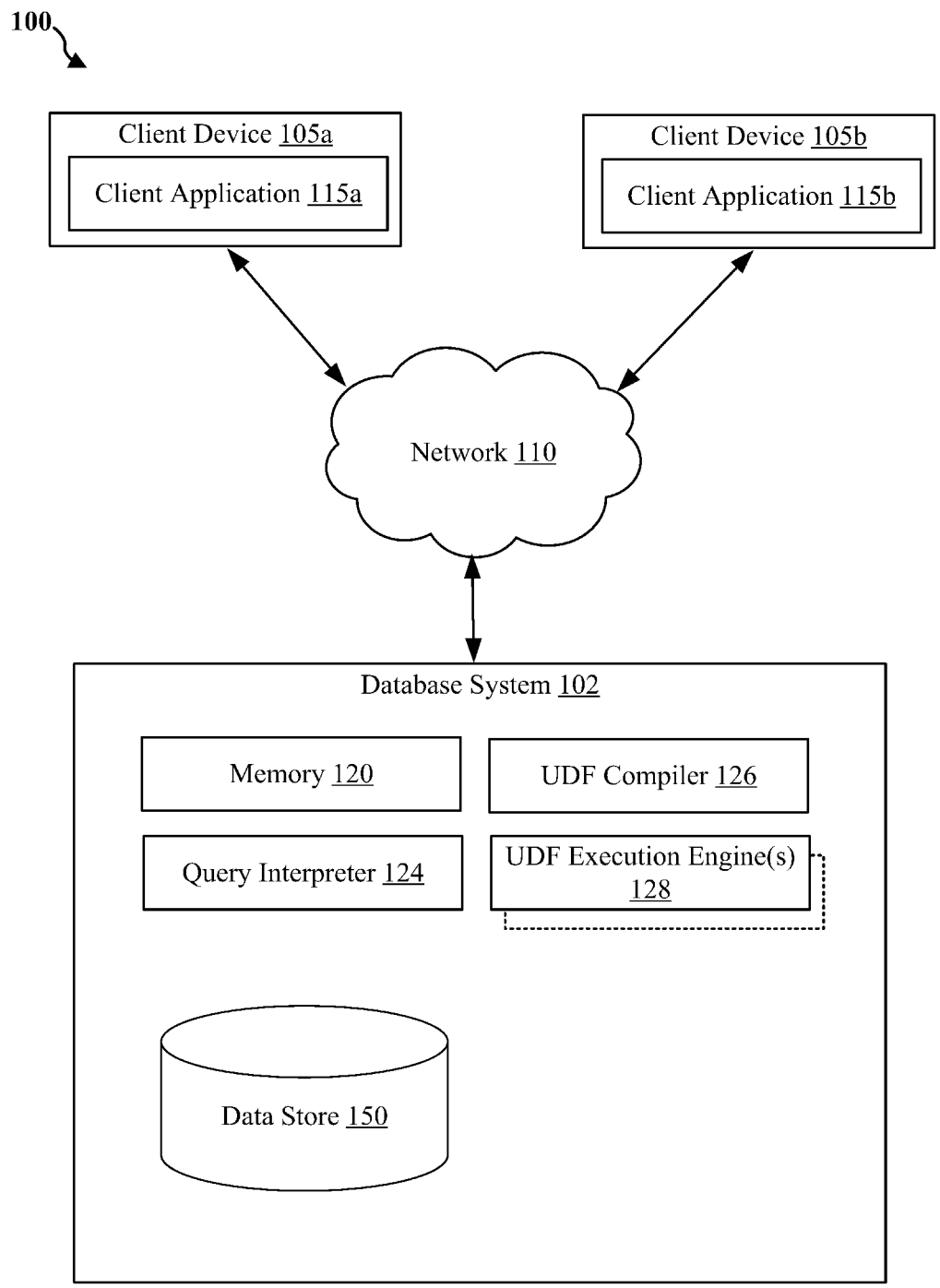
FIG. 1 illustrates an example of a computing system including a database system, in accordance with aspects described herein.

Aspects described herein relate to integrating compilation of user defined functions (UDFs) into vectorized database systems, or associated interpreted query engines. Compared to compiled query engines where UDF code can be integrated directly into the produced query code, integrating compiled UDF code into interpreted engines may present some challenges, but integrating compiled UDF code into interpreted query engines may improve scalability of UDFs. In aspects described herein, integrating compiled UDF code into interpreted query engines may include designing various models, such as an execution model for interpreted execution of the UDFs, a processing model to compare tuple-at-a-time processing to vector-at-a-time processing, and/or a parallelization model to provide parallel executing of the UDFs.

In addition, aspects described herein can address various challenges that may be associated with integrating compiled UDF code into interpreted engines. An example of such challenges may include transparency, such as from a user perspective where there may be no additional effort necessary to exploit compiled UDFs. Another example of such challenges may include external code where importing external libraries in the UDFs may be possible to benefit from the wide range of available modules to use in generating UDFs (e.g., available Python modules). Another example of such challenges may include typing where an operator can manage differences between the strictly-typed database system and the weakly-typed UDF code. Another example of such challenges may include safety where the system can be secured from unauthorized access over, or via, the UDFs.

In accordance with aspects described herein, UDFs can be compiled into shared libraries that are dynamically loaded into memory during database runtime and called during interpreted query execution. In some aspects, the shared libraries can be loaded into a memory and executed via a wrapper function that defines one or more functions in the shared libraries. The wrapper function can call the one or more functions based on a vector of input parameters for multiple columns of query results, and can return a column of results from the one or more functions. The interpreted query can use the column of results in a next step of the query (e.g., following a step that invokes the UDF). In addition, in some aspects described herein, multiple instances of the UDF, as compiled, can execute in parallel using processes outside of the interpreted query to provide the UDF results for storing in the column of results.

UDF Compilation

UDFs can be compiled using various available compilation frameworks, which may include Python and/or Python-related frameworks. The UDF compilation process, in accordance with aspects described herein, can be similar for each of the used compilation frameworks, possibly differing in minor, framework-specific details. However, current frameworks also share the same challenge related to the way that programming languages, such as Python, handles imported modules. The current frameworks are originally designed to produce a compiled module that is used in the Python interpreter engine. When facing an import statement, the Python interpreter calls the module's initialization method which initializes the module and provides an entry point to the module's functions. When calling a function afterwards, the function call is resolved using this entry point. Consequently, a module's functions may not be visible to code outside the module, especially not for the interpreted query engine, which does not run in a Python context.

In order to make the UDF code visible, one could manually rewrite the generated code. However, this may be fundamentally different for different frameworks and may make the compilation process highly dependent on the compilation framework version, as each change in the code generation may require changes in the manual code rewriting. The design of the compilation process described herein can follow the goal of abstracting from the used framework. In an example, for the compilation, the compilation frameworks can be configured to keep intermediate states of the compiled code. This way, the object files can be accessed (e.g., in the executable and linkable format (ELF)) before they are linked together to a shared library. In the ELF format, symbols may belong to the dynamic symbol table when they have global visibility and a default binding. Using ELF manipulation tools like library to instrument executable formats (LIEF), the visibility and binding of the function symbol that belongs to the UDF can be manipulated, and the last compilation step can be repeated to produce the shared library. Consequently, work may be duplicated, but in favor of abstraction from the compilation framework, so the framework's compilation behavior need not be changed to manipulate the generated files in between.

In an example, when the UDF is created, the user can specify input and output data types of the function. This may not be a restriction, as this metadata is also available in a later integration into a full-fledged database system, where a user can specify the types in a Create Function query. Using this metadata, during the compilation step, the UDF code can be annotated, much like in the case of Numba, which is described by S. K. Lam, A. Pitrou, and S. Seibert, "Numba: A LLVM-Based Python JIT Compiler," in Proceedings of the Second Workshop on the LLVM Compiler Infrastructure in HPC, LLVM '15, 2015, which is incorporated herein by reference. Additionally, supporting external modules can be a property of the compilation framework and therefore automatically provided, except for possibly the Numba framework, which may only support the Numpy library as an import. In order to achieve safety during the compilation step, a ban list of modules can be maintained and the UDF code can be scanned before the compilation for the items of the ban list. If items existing in the ban list are found in the UDF code, compilation can be cancelled or an error presented for compilation or execution of the UDF. This way, it can be avoided that users can execute statements that are potentially dangerous for the system or the underlying environment, e.g. using the operating system (os) or the sys module.

Dynamic Loading and Initialization

After compilation, the library containing the UDF can be stored at a memory or disk location that is accessible for the system. While this can be achieved in single-server database systems, even for distributed database systems this is not a limitation due to the presence of cloud storage in the cloud environment or shared storage, such as Hadoop distributed file system (HDFS) or other distributed file systems, in the case of on-premises cluster solutions. The library can be dynamically loaded into the running database application, e.g., by using dlopen/dlsym commands supported by the operating system. The loading step can be driven by the goal to avoid as much effort as possible in the later execution, especially expensive branching. As such, in an example, the library can be dynamically loaded during database runtime and before executing a query that calls the UDF.

Some Python frameworks, such as Cython, Nuitka and Numba's, use an object mode that works on PyObjects, which are the type abstraction of Python's C-application programming interface (API) and can contain arbitrary types. For these frameworks, input and output conversion functions based on the UDF signature can be initialized and stored as function pointers to avoid branching during execution.

The actual UDF's signature may however include arbitrary parameter type combinations. As the signature may not be known during the compilation of the actual database engine, a placeholder function type can be defined and a wrapper function and a function definition for multiple possible UDF signatures can be generated. The wrapper can be correctly set according to the UDF signature during the loading step and therefore introduces branching only once. As shown in an example function for a UDF that takes a long and a double parameter and returns a double in Listing 1, below, this wrapper function can cast the generic input parameters as well as the actual UDF and calls the UDF. The result is then stored at the given buffer location, which is a part of the result vector. By storing the wrapper code as a function pointer, branching during the UDF execution can be avoided, and the typing challenge described above can be addressed.

Listing 1: Example of the wrapping code

```
typedef void (*fplaceholer)(void);
typedef void (*WrapperFunc)(fplaceholder, char**, char**);
// For every parameter combination
typedef double (*dld)(long, double);
void func_38(fplaceholder f, char **params, char **out) {
    long* p0 = (long*) &params[0];
    double* p1 = (double*) &params[1];
    *((double*)out) = ((dld)f)(*p0, *p1);}
```

Besides the UDF, the symbol for the library's initialization function can also be loaded if required by the compilation framework. Again for Cython, Nuitka and Numba's object mode, the module can be initialized in the Python environment afterwards potentially using Python's multi-phase initialization. In an example, this might happen after the Python interpreter was initialized during the engine startup, depending on a system's behavior to use the Python interpreter, e.g., long-running vs. starting a (sub-)interpreter per query. This initialization can enable access to the module's internal data structures and helper functions, being similar to Python's import statement.

UDF Execution

A prototype engine, described in further detail below, can be used that follows the Volcano iterator model, in a vector-at-a-time fashion and can have a columnar storage layout. The Volcano iterator model can be as described by G. Graefe, "Volcano—An Extensible and Parallel Query Evaluation System" in IEEE Trans. on Knowl. and Data Eng., 6(1):120-135, 1994, which is incorporated herein by reference. Consequently, each UDF operator can receive a set of vectors (one for each column) from the child operator in the query tree. Keeping these vectors unchanged, the operator can add a result vector for the UDF output to the intermediate result. The compilation framework may also cause the UDF input values to be converted to PyObject elements using the respective input conversion functions, the compiled UDF can be called using the wrapper function, and/or the results can be converted back using the output conversion functions. Two or more of these steps can be performed in a vectorized fashion. Note that there is no branching in this step, as function pointers were correctly set during the dynamic loading and initialization as described above.

The performance of the UDF execution can be highly dependent on the way the UDF code is written. In commercial systems, user-written UDF code may be likely to get wrapped into a code template. This way, customized error checking mechanisms, type conversion and interpretation for complex types and vector iteration mechanisms can be achieved. For example, if the user code is written in a tuple-at-a-time fashion, the user function can be called for each element of the vector, introducing significant call overhead. If the user code is written in a vector-at-a-time fashion, the user function can be only called once, significantly increasing speed. The call overhead inside the Python code may be one of the most limiting factors for performance. Using a vectorized UDF that pre-allocates the result vector and uses list comprehension (potentially zipping multiple input vectors before), as described herein, may have improved performance.

In some aspects, UDF vectorization can be manually enabled or used by the user executing the query by (1) rewriting the UDF code to the vectorized version and (2) indicating vectorization using a prefix in the UDF naming. In some aspects, however, automatic UDF rewriting mechanism may be provided that embeds the UDF code into a vectorization template that handles list comprehension and zipping.

Another aspect of an execution engine is NULL handling. Multiple options may be provided to perform NULL handling, such as in the database engine or in the UDF code. The engine-internal handling may execute the UDF only on non-NULL values. In the vectorized variant, offsets inside the vectors may be tracked to be able to put results into the right position again after UDF execution. Performing the NULL handling in the UDF on the other hand simply requires the input conversions to produce PyNone as Python's NULL indicator. Performing NULL handling in the UDF may offer more flexibility to the user to handle NULLs. Use cases where UDFs explicitly handle cases where some parameters are NULL, may be possible, which may be difficult to support when UDF calls are skipped by the engine-internal NULL handling.

Parallelization

Using UDF compilation as described above can increase single-core performance of the UDF execution in a vectorized, interpreted query engine. However, analytical database systems can typically include massively parallel processing (MPP) systems to benefit from the increasing number of cores per socket and the possibility to scale systems in cluster environments. Consequently, it may be possible to also scale the UDF execution.

Figure 4:
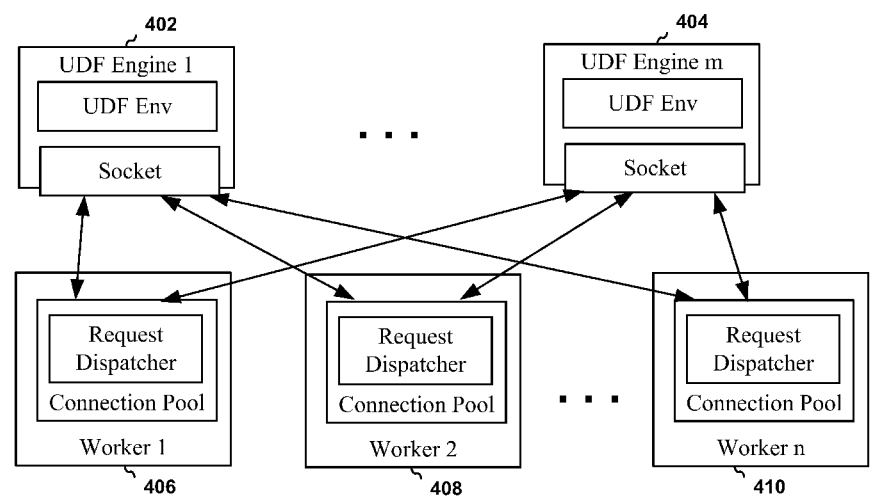
FIG. 4 shows an example of multiple concurrently executing UDF execution engines, in accordance with aspects described herein.

A MPP system may run multiple workers to execute query plans or subplans in parallel on independent data partitions. When integrating the compiled UDF approach in such a system, the frameworks that still use the Python environment (Cython, Nuitka, Numba object mode) can share the Python interpreter. This may lead to high contention due to potential global interpreter lock (GIL) issues. Consequently, enabling parallelization in Python can lead to mitigating the GIL issue. Instead of using special transactional memory, UDF engines that run as processes separately from the actual database workers can be used (e.g., workers might be either processes or threads, but UDF engines can be separate processes). These UDF engines can start their own UDF environments (e.g., Python environments), which are therefore isolated by the process semantics. Database workers and UDF engines can be scaled independently and can be connected over point-to-point socket connections, as shown in FIG. 4 and described further herein. On the database engine side, these connections can be maintained in a connection pool and requests (e.g., UDF execution requests) can be dispatched over a scheduling strategy. FIG. 4 depicts multiple UDF engines 1, m, (UDF Engine 402, . . . , 404) each executing the UDF environment (e.g., Python environment) and communicating over socket to one or more worker threads 1, 2, . . . , n (e.g., Worker threads 406, 408, . . . , 410). The worker threads can include a connection pool and a request dispatcher to manage requests to the UDF engines via the sockets (e.g., to cause execution of the UDFs or corresponding shared libraries, to communicate UDF input/output values or other parameters/instructions from/to the UDF engines, etc.) In one aspect, a simple round robin assignment strategy can be used to assign requests to UDF engines. As vector sizes are fixed, this strategy can provide a balanced utilization of the UDF engines. Even when data is skewed, the unbalanced load in the database workers may be balanced among the UDF engines. After execution, results can be sent back to the database workers over the socket connection. This "remote UDF" approach again can be a tradeoff, as it introduces inter-process communication and data transfer while enabling parallel execution in the Python environment. As a side effect, moving the Python execution to separate processes offers possibilities to improve the security of running Python, e.g. by running the UDF engines in containers.

Example Engine Design

One possible UDF engine design can follow the common properties of modern analytical database systems, as an in-memory engine that organizes data in a columnar layout. Columns values are tightly packed as arrays in memory resulting in efficient access when iterating over this data. Variable-sized types like strings can be stored as pointers to the memory region that includes the data. Additionally, the engine can follow the Volcano iterator model, described above, so an operator can implement a common interface of some functions, such as an open( ), next( ) and close( ) function, for example. The next( ) functions can be implemented using vector-at-a-time processing. In one example, the engine can use a basic file scan operator, multiple different UDF operators, logic to "consume" the query result at the end of a query and a fine-grained profiling mechanism.

The engine can include one or more compilation/transpilation frameworks, such as Numba, Nuitka and Cython. A separate operator encapsulating each of the frameworks can be created, as described above. During the open( ) call, the UDF code can be compiled using the respective framework, dynamically loaded into the running engine, initialized, etc. As a baseline, in one specific non-limiting example, a native Python UDF operator can be designed, based on the Python C-API. In order to achieve the transparency, in this example, the native Python operator can be used as a fallback in case of compilation or loading errors.

In one specific non-limiting example, the compilation process can be performed using a Python script consisting of calling the framework, modifying symbol visibility and re-running the last compilation step, as described above. As this script is not changed during database runtime and includes Python code, it can be compiled using the compilation script itself to produce a shared library containing the compilation logic and dynamically linked with the database engine. As a result, calling library functions can be faster than invoking a Python script out of the database engine.

Example Operating Environment

FIG. 1 illustrates an example of a computing system 100 including a database system 102, in accordance with an aspect of the disclosure. The database system 102 has multiple architectural components including a memory 120, query interpreter 124, UDF compiler 126, UDF execution engine(s) 128, and data store 150. (A letter after a reference numeral, such as "105 a," indicates that the text refers specifically to the element having that particular reference numeral, while a reference numeral in the text without a following letter, such as "105," refers to any or all of the elements in the figures bearing that reference numeral, i.e., "105 a," "105 b," "105 c," etc.).

The database system 102 can include any type of processor, for example, standard x86 servers running Linux or multi-core systems. Users and applications may communicate with the database system 602 via standard interfaces, for example, American Nation Standards Institute (ANSI) structured query language (SQL) via open database connectivity (ODBC)/Java database connectivity (JDBC). The database system 602 is also interchangeably referred herein as "the system" or "database." In addition, one or more components of the database system 102 can be distributed over the network 110, such as in a cloud-computing environment, and nodes hosting the one or more components may communicate with one another to provide the functionality of the database system 102 described herein.

The database system 102 performs processing and storing of data. The database system 102 controls sessions, parsing and optimizing queries, and scheduling execution of the workload. The database system 102 may be optimized for outward communication and handling of query overhead so the resources of the database system 102 are utilized for performing data operations. In an aspect, the database system 102 can be a vectorized database system that can process interpreted queries, as described herein.

The data store 150 stores data on a data storage device, for example, a disk. This data includes relations or tables comprising rows and columns of user data. For instance, example tables are t1, t2, t3, . . . , tn, where table t1 has columns a1, b1, c1, table t2 has columns a2, b2, c2, table t3 has columns a3, b3, c3, and so on unless indicated otherwise. In some aspects, data stored in one column is of the same data attributes. For example, data stored in the same column is of the same data type, character set, and collation attribute value.

The memory 120 can store instructions related to executing database queries, executing UDFs, etc., as described further herein. The query interpreter 124 can receive queries from client devices 105 and generate execution plans for the received queries. Users and applications can issue queries. For a particular interpreted query, the query interpreter 124 can execute each step in-turn, as described. Some queries can include calls to UDFs. In accordance with aspects described herein, UDF compiler 126 can compile the UDFs for use with interpreted queries. UDF execution engine(s) 128 can execute a UDF, which may include executing multiple instances of the UDF in parallel.

Client devices 105 can be computing devices that execute client software, e.g., a web browser or built-in client application, to interact with the parallel database system 102 via a network. Note that the terms "client" or "client device," as used herein may refer to software providing respective functionality, to hardware on which the software executes, or to the entities operating the software and/or hardware, as is apparent from the context in which the terms are used. For example, a client device 105 may execute business intelligence software or analytic tools that send interactions with the database system 102.

In one aspect, the client device 105 can be a personal computer (PC), a desktop computer, a laptop computer, a notebook, a tablet PC executing an operating system, for example, a Microsoft Windows-compatible operating system (OS), Apple OS X, and/or a Linux distribution. In another aspect, the client device 105 can be any device having computer functionality, such as a personal digital assistant (PDA), mobile telephone, smartphone, etc. In an aspect, a client of the database system can be another process, for example, a web server that serves queries from remote devices.

The interactions between the client devices 105 and the database system 102 can typically be performed via a network 110, for example, via the Internet. The network 110 enables communications between the client device 105 and the database system 102. In one aspect, the network 110 uses standard communications technologies and/or protocols. In another aspect, the entities can use custom and/or dedicated data communications technologies instead of, or in addition to, the ones described above. Depending upon the variation, the network 110 can also include links to other networks such as the Internet. In addition, for example, portions of the database system 102 may be remotely located from one another, and may communicate over the network 110, Internet, etc. In an example, as described, data can be stored in multiple data stores 150 distributed over a network 110, such as in a cloud-computing environment. In another example, UDFs compiled into shared libraries by UDF compiler 126 may be stored in cloud storage accessible via network 110.

Figure 2:
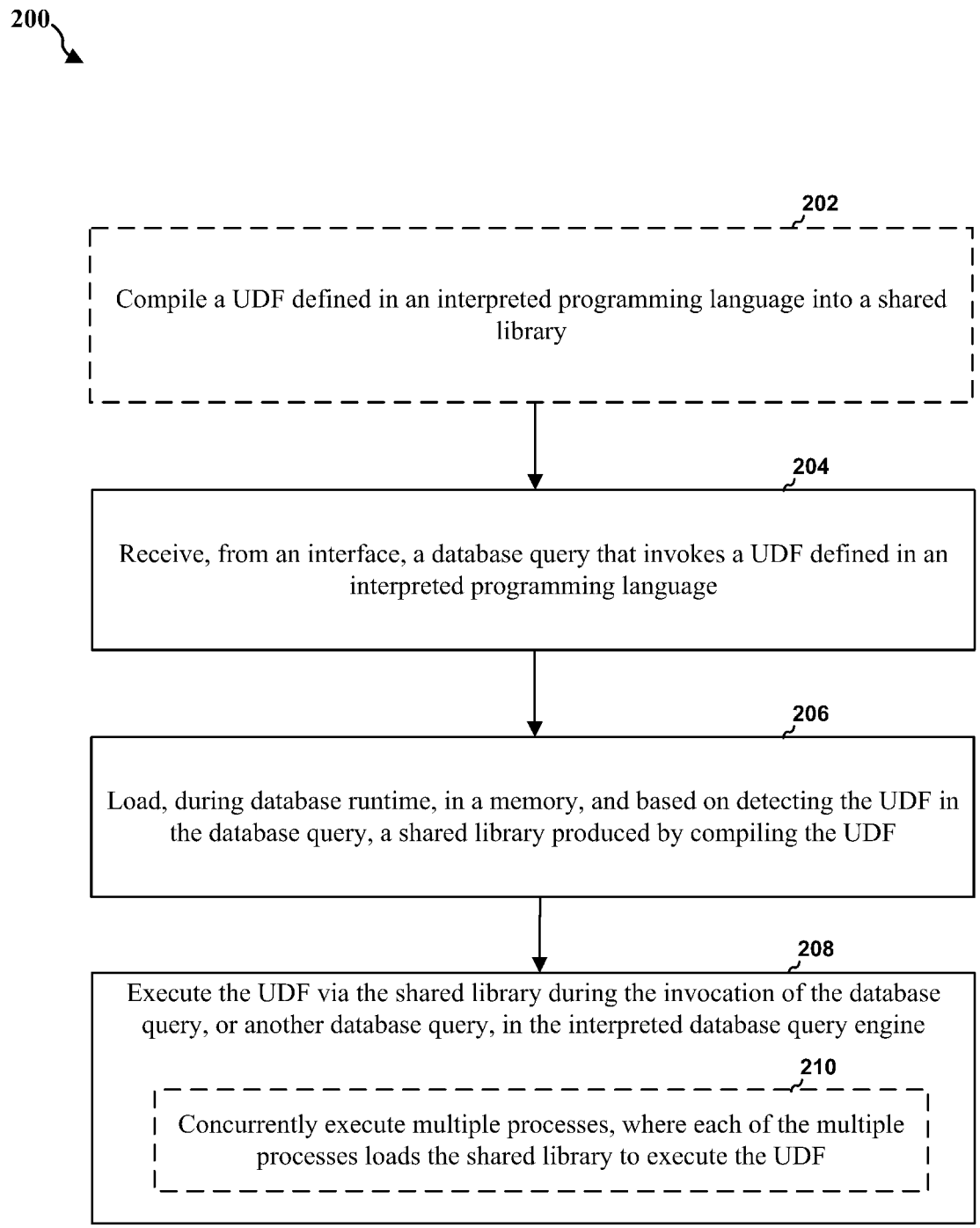
FIG. 2 illustrates an example of a method for executing a compiled user defined function (UDF) in an interpreted database query engine, in accordance with aspects described herein.

FIG. 2 is a flowchart of an example of a method 200 of database operation for incorporating compiled UDFs into interpreted database queries. The method 200 may be performed by one or more components of the database system 102, such as query interpreter 124, UDF compiler 126, UDF execution engine(s) 128, etc.

Optionally, at block 202, the method 200 may include compiling a UDF defined in an interpreted programming language into a shared library. For example, one or more components of the database system 102, such as UDF compiler 126, in conjunction with one or more processors, a memory 120 storing instructions for executing on a processor and/or related data, etc., may compile the UDF defined in the interpreted programming language into the shared library. For example, UDF compiler 126 can receive the UDF at some point prior to execution of a database query that calls the UDF, prior to (and/or separate from) database runtime, etc. UDF compiler 126, for example, can compile the UDF into the shared library using one or more applications to translate source code from the interpreted programming language to another programming language that can be compiled. For example, the UDF, as described, can be written in an interpreted programming language, such as Python. In one example, UDF compiler 126 can translate the Python UDF to a programming language such as C, and may use a C compiler to compile the UDF into the shared library. For example, UDF compiler 126 may use or may include Numba or another just-in-time (JIT) or ahead-of-time (AOT) Python compiling application, as described above.

At block 204, the method 200 may include receiving, from an interface, a database query that invokes a UDF defined in an interpreted programming language. For example, one or more components of the database system 102, such as query interpreter 124, in conjunction with one or more processors, a memory 120 storing instructions for executing on a processor and/or related data, etc., may receive, from the interface, the database query that invokes the UDF defined in the interpreted programming language. Query interpreter 124 can receive the database query from a client interacting with the interface, where the client can include a user interacting with a graphical interface (e.g., to enter the query using a query language, such as SQL), an application interacting with an application programming interface (API) provided by the database system 102, etc. The received database query can be in a format of the query language, such as SQL, which may allow for specifying or defining a UDF. In one example, the received database query can specify the UDF to be called as part of the query where the UDF is defined. In another example, the received database query can define (e.g., can specify the programming language code for) the UDF. In any case, for example, the UDF, as described, can be written in an interpreted programming language, such as Python.

At block 206, the method 200 may include loading, in a memory and based on detecting the UDF in the database query, a shared library produced by compiling the UDF. For example, one or more components of the database system 102, such as query interpreter 124, UDF compiler 126, UDF execution engine(s) 128, etc., in conjunction with one or more processors, a memory 120 storing instructions for executing on a processor and/or related data, etc., may load, in the memory 120 and based on detecting the UDF in the database query (e.g., detecting the indication of the UDF in the database query), the shared library produced by compiling the UDF. Query interpreter 124 can load the shared library during a runtime of the database system 102, while executing the database query, etc. In one example, UDF compiler 126 can compile the UDF into the shared library at database runtime and before the UDF is called to optimize performance of the database query, such that compilation of the UDF occurs before execution of the database query. In an example, as described, UDF compiler 126 can store the shared library, once compiled, in a location accessible by the query interpreter 124 so the compiled UDF can be called during query execution.

For example, query interpreter 124 can detect the UDF call in a step of an interpreted database query. Based on detecting the UDF call, query interpreter 124 can obtain the shared library that is produced from the UDF. In one example, the shared library can be stored in a memory 120, data store 150, or other disk of database system 102 accessible by the query interpreter 124. In another example, the shared library can be stored in a cloud-computing system, and query interpreter 124 can obtain the shared library from cloud storage or other network storage. In any case, query interpreter 124 can load the shared library into memory 120 to allow for executing (e.g., by the query interpreter 124 or otherwise) one or more functions of the UDF that are compiled in the shared library.

At block 208, the method 200 may include executing the UDF via the shared library during the invocation of the database query, or another database query, in the interpreted database query engine. For example, one or more components of the database system 102, such as query interpreter 124, UDF execution engine(s) 128, etc., in conjunction with one or more processors, a memory 120 storing instructions for executing on a processor and/or related data, etc., may execute the UDF via the shared library during the invocation of the database query, or another database query, in the interpreted database query engine. For example, one or more UDF execution engines 128 can execute the UDF based on a call or command from the query interpreter 124, where the query interpreter parses the UDF call from the database query. In one specific example, as described herein, query interpreter 124 can call a wrapper function selected by the query interpreter 124, which can have a similar function signature as the UDF, to execute the one or more function calls in the shared library that was produced by compiling the UDF.

As described, in an example, in executing the UDF at block 208, optionally at block 210, multiple processes can be concurrently executed, where each of the multiple processes loads the shared library to execute the UDF. For example, multiple UDF execution engines 128, in one or more processes or threads, in conjunction with one or more processors, a memory 120 storing instructions for executing on a processor and/or related data, etc., may concurrently execute the multiple processes, where each of the multiple processes loads the shared library to execute the UDF. In this example, multiple instances of the UDF can essentially execute in parallel to generate outputs used in subsequent steps of the database query.

An example is shown in FIG. 4, where multiple UDF engines 402, . . . , 404 are executed, which each have their own UDF environment (e.g., Python environment) and a socket connection to communicate with Worker threads 406, 408, . . . , 410. Each UDF engine 402, . . . , 404 can operate on an input from the database query and can produce an output to be used in the database query, as described herein.

Figure 3:
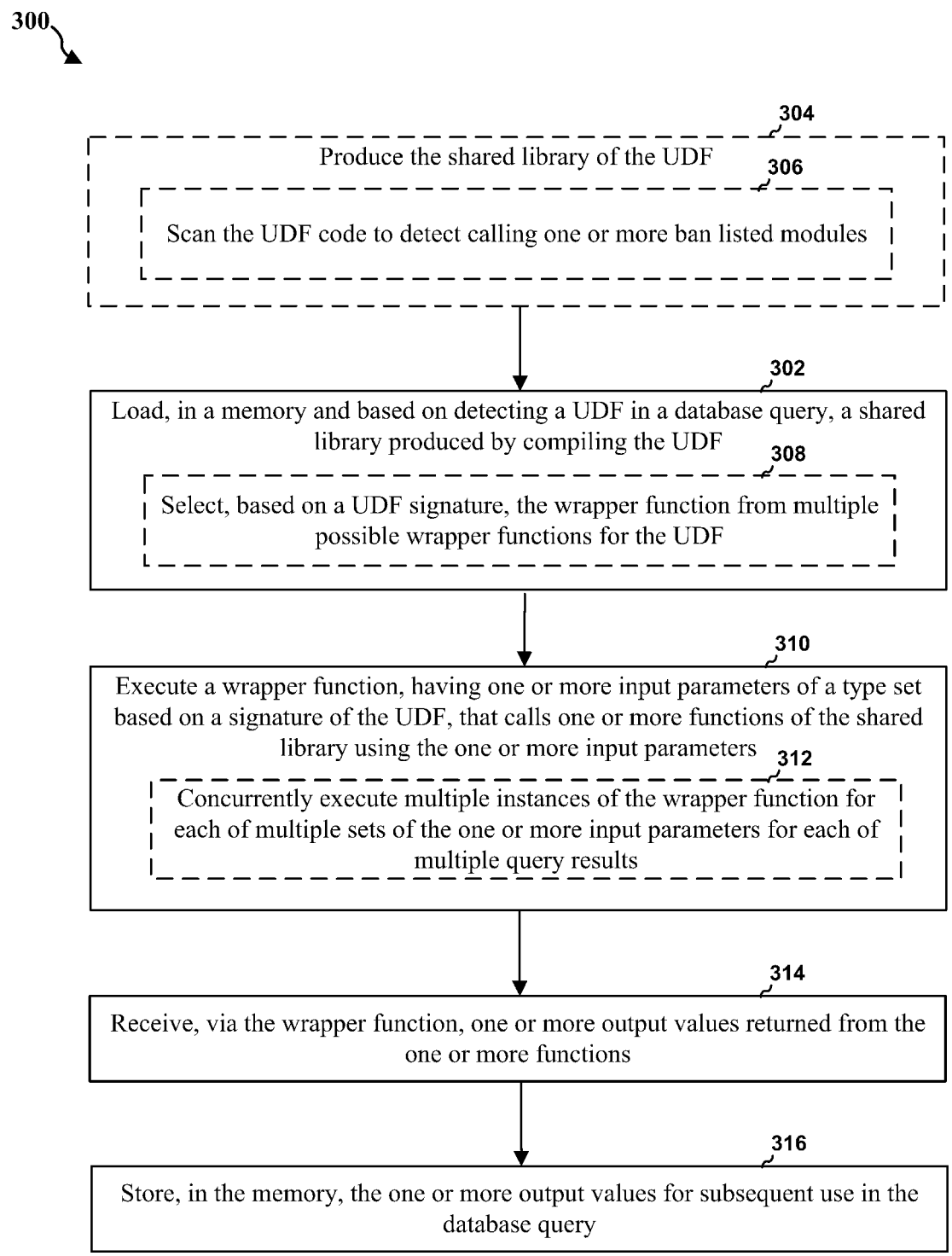
FIG. 3 illustrates an example of a method for executing a compiled (UDF) in an interpreted database query engine using a wrapper function, in accordance with aspects described herein.

FIG. 3 is a flowchart of an example of a method 300 of database operation for incorporating compiled UDFs into interpreted database queries using a wrapper function. The method 300 may be performed by one or more components of the database system 102, such as query interpreter 124, UDF compiler 126, UDF execution engine(s) 128, etc.

At block 302, the method 300 may include loading, in a memory and based on detecting a UDF in a database query, a shared library produced by compiling the UDF. For example, one or more components of the database system 102, such as query interpreter 124, UDF compiler 126, UDF execution engine(s) 128, etc., in conjunction with one or more processors, a memory 120 storing instructions for executing on a processor and/or related data, etc., may load, in the memory 120 and based on detecting a UDF in the database query, the shared library produced by compiling the UDF. Query interpreter 124 can load the shared library during a runtime of the database system 102, while executing the database query, etc. For example, query interpreter 124 can detect the UDF call in a step of an interpreted database query. Based on detecting the UDF call, query interpreter 124 can obtain the shared library that is produced from the UDF (e.g., as compiled using a JIT or AOT compiler, as described above, and stored in a location accessible by the query interpreter 124 or other component that can parse the database query and/or load the UDF). In one example, the shared library can be stored in a cloud-computing system, and query interpreter 124 can obtain the shared library from cloud storage or other network storage. In any case, query interpreter 124 can load the shared library into memory 120 to allow executing one or more functions of the UDF that are compiled in the shared library.

At block 304, the method 300 may optionally include producing the shared library of the UDF. For example, one or more components of the database system 102, such as query interpreter 124, UDF compiler 126, UDF execution engine(s) 128, etc., in conjunction with one or more processors, a memory 120 storing instructions for executing on a processor and/or related data, etc., may produce the shared library of the UDF. In an example, query interpreter 124 can produce the shared library of the UDF during a runtime of the database system 102, while executing the database query, etc. For example, UDF compiler 126 may produce the shared library of the UDF by compiling the UDF, which may be based on a previous or modified compilation process, as described above. In one example, UDF compiler 126 may compile the UDF based on query compiling component 124 detecting the UDF call in the interpreted query. In other examples, UDF compiler 126 can precompile the UDF before the interpreted query is executed, as described above.

In an example, UDF compiler 126 can compile the UDF to produce the shared library, as described above. For example, a symbol table of an object file can include function symbols for each function (including the UDF and the initialization function), where each function symbol can have a "binding" property and a "visibility" property. In this example, compiling the UDF to produce the shared library may include UDF compiler 126 compiling the UDF using the compilation framework, retrieving the function symbols from the object's symbol table, changing the "binding" property and the "visibility" property of the symbol that belongs to the UDF in order to make the function callable from outside of the UDF framework, and/or repeating the last linking step to finally produce the shared library. Modifying the shared library in this regard to allow outside calling of the one or more functions can allow the query interpreter 124 access to the functions of the shared library during query execution. In this example, query interpreter 124 can load the shared library (e.g., at block 302) at least in part by calling at least the initialization function of the shared library of the UDF.

In producing the shared library at block 304, optionally at block 306, the UDF code may be scanned to possibly detect calling one or more ban listed modules. For example, one or more components of the database system 102, such as query interpreter 124, UDF compiler 126, UDF execution engine(s) 128, etc., in conjunction with one or more processors, a memory 120 storing instructions for executing on a processor and/or related data, etc., may scan the UDF code to detect calling one or more ban listed modules. For example, UDF compiler 126 can access the list of ban listed modules, which may be stored in memory 120 or otherwise accessible by the UDF compiler 126. If calling of one or more ban listed modules is detected when compiling the UDF, for example, UDF compiler 126 can refrain from producing the shared library and/or can notify of the forbidden module call.

In loading the shared library at block 302, optionally at block 308, a wrapper function can be selected from multiple possible wrapper functions for the UDF based on a signature of the UDF. For example, one or more components of the database system 102, such as query interpreter 124, UDF compiler 126, UDF execution engine(s) 128, etc., in conjunction with one or more processors, a memory 120 storing instructions for executing on a processor and/or related data, etc., may select, based on the signature of the UDF, the wrapper function from the multiple possible wrapper functions for the UDF. For example, multiple possible wrapper functions can be generated for UDFs, as described above. A given wrapper function, for example, can include a function signature, and can be configured to call a UDF having the same signature. In this regard, for example, query interpreter 124 can determine which of the multiple possible wrapper functions has a signature that matches a signature of the UDF, and can select this wrapper function for executing one or more functions defined in the shared library.

At block 310, the method 300 may include executing a wrapper function, having one or more input parameters of a type set based on a signature of the UDF, that calls one or more functions of the shared library using the one or more input parameters. For example, one or more components of the database system 102, such as query interpreter 124, UDF compiler 126, UDF execution engine(s) 128, etc., in conjunction with one or more processors, a memory 120 storing instructions for executing on a processor and/or related data, etc., may execute the wrapper function, having the one or more input parameters of the type set based on the signature of the UDF, that calls one or more functions of the shared library using the one or more input parameters. For example, one or more UDF execution engines 128 can execute the wrapper function selected by the query interpreter 124, which can have a similar function signature as the UDF, to execute the one or more function calls. For example, the one or more UDF execution engines 128 can pass a vector of the one or more input parameters as input the one or more functions, and can do this for each of multiple sets of the one or more input parameters, in one example.

As described, in an example, in executing the wrapper function at block 310, optionally at block 312, multiple instances of the wrapper function can be concurrently executed for each of multiple sets of the one or more input parameters for each of multiple query results. For example, multiple UDF execution engines 128, in one or more processes or threads, in conjunction with one or more processors, a memory 120 storing instructions for executing on a processor and/or related data, etc., may concurrently execute the multiple instances of the selected wrapper function for each of the multiple sets of the one or more input parameters for each of multiple query results. For example, the interpreted query may produce multiple results, which can be stored in columnar format, for providing as input to the UDF. For example, the query results can be stored as a column of input vectors. In this example, the database system 102 can execute multiple UDF execution engines 128 to concurrently call the shared library, each with a different input vector in the column, to parallelize the UDF for the dataset.

At block 314, the method 300 may include receiving, via the wrapper function, one or more output values returned from the one or more functions. For example, one or more components of the database system 102, such as query interpreter 124, UDF compiler 126, UDF execution engine(s) 128, etc., in conjunction with one or more processors, a memory 120 storing instructions for executing on a processor and/or related data, etc., may receive, via the wrapper function, the one or more output values returned from the one or more functions. For example, each UDF execution engine 128 can obtain one or more output values returned from the one or more functions, of the shared library produced from the UDF, on the one or more input parameters.

At block 316, the method 300 may include storing, in the memory, the one or more output values for subsequent use in the database query. For example, one or more components of the database system 102, such as query interpreter 124, UDF compiler 126, UDF execution engine(s) 128, etc., in conjunction with one or more processors, a memory 120 storing instructions for executing on a processor and/or related data, etc., may store, in the memory 120, the one or more output values for subsequent use in the database query. In one example, as described, UDF execution engine(s) 128 can store the one or more output values in columnar format, where each column includes one or more output values resulting from a single UDF call on an associated set of input parameters. In one example, vector can be added to the columnar stored input parameters to store the one or more output parameters corresponding to the input parameters. In an example, the one or more output parameters can be used in a next step of the interpreted database query.

Figure 5:
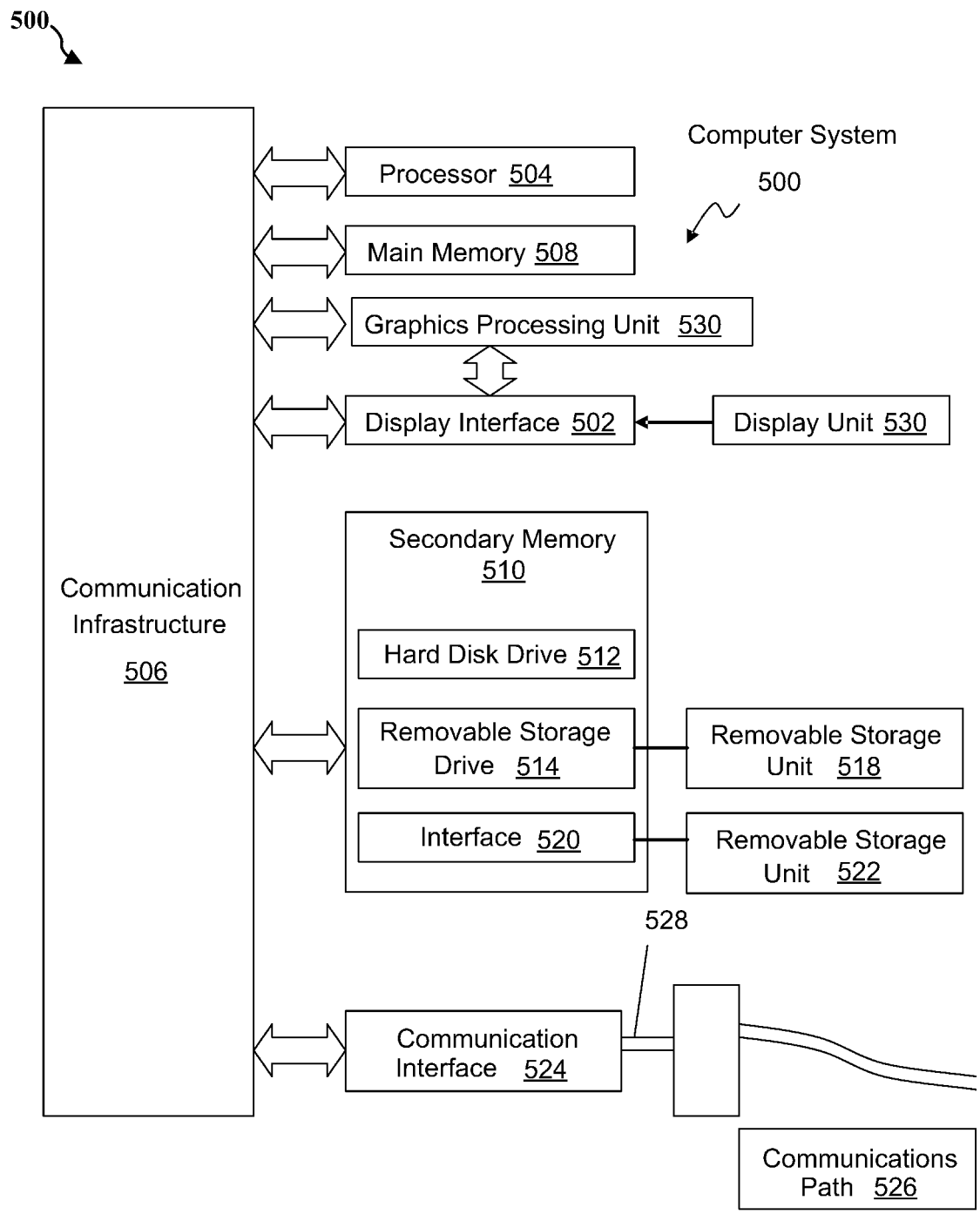
FIG. 5 presents an example system diagram of various hardware components and other features, for use in accordance with aspects of the present disclosure.

FIG. 5 presents an example system diagram of various hardware components and other features that may be used in accordance with aspects of the present disclosure. Aspects of the present disclosure may be implemented using hardware, software, or a combination thereof and may be implemented in one or more computer systems or other processing systems. In one example variation, aspects of the disclosure are directed toward one or more computer systems capable of carrying out the functionality described herein. An example of such a computer system 500 is shown in FIG. 5.

Computer system 500 includes one or more processors, such as processor 504. The processor 504 is connected to a communication infrastructure 506 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 500 may include a display interface 502 that forwards graphics, text, and other data from the communication infrastructure 506 (or from a frame buffer not shown) for display on a display unit 530. Computer system 500 also includes a main memory 508, preferably random access memory (RAM), and may also include a secondary memory 510. The secondary memory 510 may include nonvolatile memory, for example, a hard disk drive 512, flash memory and/or a removable storage drive 514, representing a floppy disk drive, a magnetic tape drive, an optical disk drive, etc. The removable storage drive 514 reads from and/or writes to a removable storage unit 518 in a well-known manner. Removable storage unit 518, represents a USB memory drive, SD card, floppy disk, magnetic tape, optical disk, etc., which is read by and written to removable storage drive 514. As will be appreciated, the removable storage unit 518 includes a computer usable storage medium having stored therein computer software and/or data.

In alternative aspects, secondary memory 510 may include other similar devices for allowing computer programs or other instructions to be loaded into computer system 500. Such devices may include, for example, a removable storage unit 522 and an interface 520. Examples of such may include a program cartridge and cartridge interface (such as that found in video game devices), a removable memory chip (such as an erasable programmable read only memory (EPROM), or programmable read only memory (PROM)) and associated socket, and other removable storage units 522 and interfaces 520, which allow software and data to be transferred from the removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a Personal Computer Memory Card International Association (PCMCIA) slot and card, etc. Software and data transferred via communications interface 524 are in the form of signals

528, which may be electronic, electromagnetic, optical or other signals capable of being received by communications interface 524. These signals 528 are provided to communications interface 524 via a communications path (e.g., channel) 526. This path 526 carries signals 528 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 514, a hard disk installed in hard disk drive 512, and signals 528. These computer program products provide software to the computer system 500. Aspects of the disclosure are directed to such computer program products.

Computer programs (also referred to as computer control logic) are stored in main memory 508 and/or secondary memory 510. Computer programs may also be received via communications interface 524. Such computer programs, when executed, enable the computer system 500 to perform various features in accordance with aspects of the present disclosure, as discussed herein. In particular, the computer programs, when executed, enable the processor 504 to perform such features. Accordingly, such computer programs represent controllers of the computer system 500.

In variations where aspects of the disclosure are implemented using software, the software may be stored in a computer program product and loaded into computer system 500 using removable storage drive 514, hard disk drive 512, or communications interface 520. The control logic (software), when executed by the processor 504, causes the processor 504 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

Figure 6:
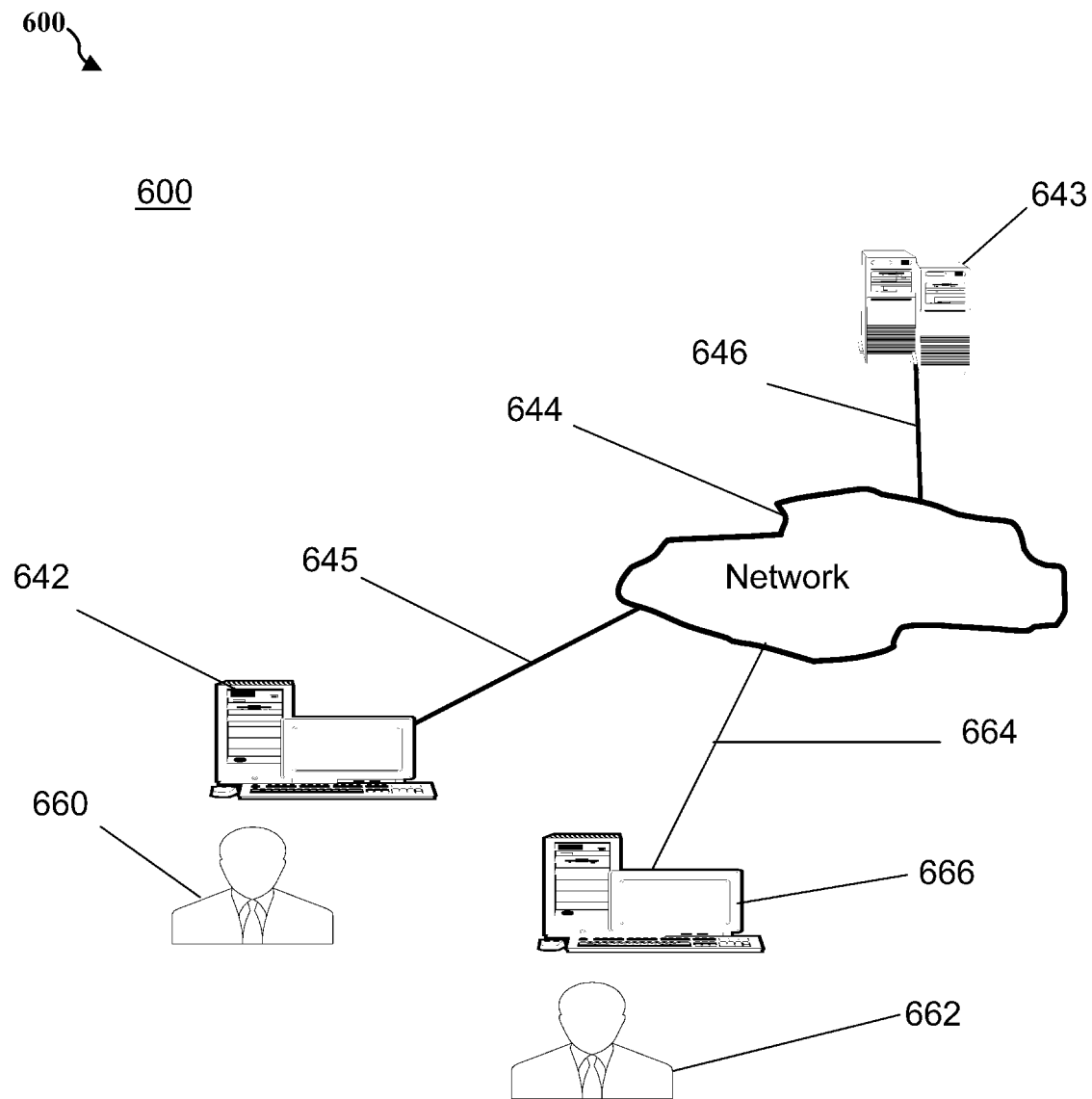
FIG. 6 is a block diagram of various example system components, for use in accordance with aspects of the present disclosure.

FIG. 6 is a block diagram of various example system components (e.g., on a network) that may be used in accordance with aspects of the present disclosure. The system 600 may include one or more accessors 660, 662 (also referred to interchangeably herein as one or more "users") and one or more terminals 642, 666. In one aspect, data for use in accordance with aspects of the present disclosure may, for example, be input and/or accessed by accessors 660, 662 via terminals 642, 666, such as personal computers (PCs), minicomputers, mainframe computers, microcomputers, telephonic devices, or wireless devices, such as personal digital assistants ("PDAs") or a hand-held wireless devices coupled to a server 643, such as a PC, minicomputer, mainframe computer, microcomputer, or other device having a processor and a repository for data and/or connection to a repository for data, via, for example, a network 644, such as the Internet or an intranet, and couplings 645, 646, 664. The couplings 645, 646, 664 include, for example, wired, wireless, or fiber optic links. In another example variation, the method and system in accordance with aspects of the present disclosure operate in a stand-alone environment, such as on a single terminal.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

The foregoing description, for purpose of explanation, has been with reference to specific aspects. However, the illustrative discussions above are not intended to be exhaustive or to limit the disclosure to the precise forms disclosed. Many modifications and variations are possible in view of the above teachings. The aspects were chosen and described in order to best explain the principles of the disclosure and its practical applications, to thereby enable others skilled in the art to best utilize the disclosure and various aspects with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present disclosure, for example, aspects of the innovations herein may be implemented consistent with numerous general purpose or special purpose computing systems or configurations. Various example computing systems, environments, and/or configurations that may be suitable for use with the innovations herein may include, but are not limited to: software or other components within or embodied on personal computers, servers or server computing devices such as routing/connectivity components, hand-held or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The disclosure may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general-purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software, and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the disclosure or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosure, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the disclosure have been specifically described herein, it will be apparent to those skilled in the art to which the disclosure pertains that variations and modifications of the various implementations shown and described herein may be made without departing from the spirit and scope of the disclosure. Accordingly, it is intended that the disclosure be limited only to the extent required by the applicable rules of law.

While the foregoing has been with reference to a particular aspect of the disclosure, it will be appreciated by those skilled in the art that changes in this aspect may be made without departing from the principles and spirit of the disclosure, the scope of which is defined by the appended claims.

What is claimed is:

1. A computer-implemented method for executing a compiled user defined function (UDF) in an interpreted database query engine, comprising:
   receiving, from an interface, a database query that invokes a UDF defined in an interpreted programming language;
   producing a shared library of the UDF at least in part by:
      obtaining an object file compiled from the UDF; and
      modifying, in a function symbol table in the object file, a binding property and a visibility property of one or more function symbols that correspond to one or more functions to expose the one or more functions in the shared library; and
      executing a last compilation step of linking the object file to produce the shared library;
   loading, during database runtime, in a memory, and based on detecting the UDF in the database query, the shared library produced by compiling the UDF; and
   executing the UDF via the shared library during the invocation of the database query, or another database query, in the interpreted database query engine.

2. The computer-implemented method of claim 1, wherein executing the UDF includes concurrently executing multiple processes, wherein each process of the multiple processes loads the shared library to execute the UDF.

3. The computer-implemented method of claim 1, further comprising:
   executing a generic wrapper function, having one or more input parameters of a type set based on a signature of the UDF, that calls the one or more functions of the shared library using the one or more input parameters, wherein the one or more input parameters are set to one or more input values obtained during the database query;
   receiving, via the generic wrapper function, one or more output values returned from the one or more functions; and
   storing, in the memory, the one or more output values for subsequent use in the database query.

4. The computer-implemented method of claim 3, wherein executing the generic wrapper function includes concurrently executing multiple instances of the generic wrapper function for each of multiple sets of the one or more input parameters for each of multiple query results from the database query.

5. The computer-implemented method of claim 4, wherein concurrently executing the multiple wrapper functions includes concurrently executing the multiple wrapper functions in separate processes from the database query.

6. The computer-implemented method of claim 3, further comprising selecting the generic wrapper function from multiple possible generic wrapper functions based on the signature of the UDF.

7. The computer-implemented method of claim 1, wherein loading the shared library in the memory includes loading a symbol for an initialization function of the one or more functions retrieved from the shared library.

8. The computer-implemented method of claim 1, wherein producing the shared library of the UDF further comprises scanning code of the UDF to determine whether a module maintained in a ban list of modules is called by the UDF.

9. A system for executing a compiled user defined function (UDF) in an interpreted database query engine, comprising:
   a memory configured to store instructions; and
   one or more processors communicatively coupled with the memory, wherein the one or more processors are configured to:
      receive, from an interface, a database query that invokes a UDF defined in an interpreted programming language;
      produce a shared library of the UDF at least in part by:
         obtaining an object file compiled from the UDF; and
         modifying, in a function symbol table in the object file, a binding property and a visibility property of one or more function symbols that correspond to one or more functions to expose the one or more functions in the shared library; and
         executing a last compilation step of linking the object file to produce the shared library;
      load, during database runtime, in a memory, and based on detecting the UDF in the database query, the shared library produced by compiling the UDF; and
      execute the UDF via the shared library during the invocation of the database query, or another database query, in the interpreted database query engine.

10. The system of claim 9, wherein the one or more processors are configured to execute the UDF at least in part by concurrently executing multiple processes, wherein each process of the multiple processes loads the shared library to execute the UDF.

11. The system of claim 9, wherein the one or more processors are further configured to:
   execute a generic wrapper function, having one or more input parameters of a type set based on a signature of the UDF, that calls the one or more functions of the shared library using the one or more input parameters, wherein the one or more input parameters are set to one or more input values obtained during the database query;
   receive, via the generic wrapper function, one or more output values returned from the one or more functions; and
   store, in the memory, the one or more output values for subsequent use in the database query.

12. The system of claim 11, wherein the one or more processors are configured to execute the generic wrapper function at least in part by concurrently executing multiple wrapper functions for each of multiple sets of the one or more input parameters for each of multiple query results from the database query.

13. The system of claim 12, wherein concurrently executing the multiple wrapper functions includes concurrently executing multiple instances of the generic wrapper functions in separate processes from the database query.

14. The system of claim 11, wherein the one or more processors are further configured to select the generic wrapper function from multiple possible generic wrapper functions based on the signature of the UDF.

15. The system of claim 9, wherein the one or more processors are configured to load the shared library in the memory at least in part by loading a symbol for an initialization function of the one or more functions retrieved from the shared library.

16. The system of claim 9, wherein the one or more processors are configured to produce the shared library of the UDF at least in part by scanning code of the UDF to determine whether a module maintained in a ban list of modules is called by the UDF.

17. A non-transitory computer-readable medium comprising code executable by one or more processors for executing a compiled user defined function (UDF) in an interpreted database query engine, the code comprising code for:
- receiving, from an interface, a database query that invokes a UDF defined in an interpreted programming language;
- producing a shared library of the UDF at least in part by:
  - obtaining an object file compiled from the UDF; and
  - modifying, in a function symbol table in the object file, a binding property and a visibility property of one or more function symbols that correspond to one or more functions to expose the one or more functions in the shared library; and
  - executing a last compilation step of linking the object file to produce the shared library;
- loading, during database runtime, in a memory, and based on detecting the UDF in the database query, the shared library produced by compiling the UDF; and
- executing the UDF via the shared library during the invocation of the database query, or another database query, in the interpreted database query engine.

18. The non-transitory computer-readable medium of claim 17, wherein executing the UDF includes concurrently executing multiple processes, wherein each process of the multiple processes loads the shared library to execute the UDF.

19. The non-transitory computer-readable medium of claim 17, the code further comprising code for:
- executing a generic wrapper function, having one or more input parameters of a type set based on a signature of the UDF, that calls the one or more functions of the shared library using the one or more input parameters, wherein the one or more input parameters are set to one or more input values obtained during the database query;
- receiving, via the generic wrapper function, one or more output values returned from the one or more functions; and
- storing, in the memory, the one or more output values for subsequent use in the database query.

20. The non-transitory computer-readable medium of claim 17, wherein the code for executing the generic wrapper function concurrently executes multiple instances of the generic wrapper function for each of multiple sets of the one or more input parameters for each of multiple query results from the database query.

* * * * *